US008705432B2

(12) United States Patent
Min et al.

(10) Patent No.: US 8,705,432 B2
(45) Date of Patent: Apr. 22, 2014

(54) METHOD AND SYSTEM FOR TRANSMITTING/RECEIVING DATA IN COMMUNICATION SYSTEM

(75) Inventors: Chan-Ho Min, Yongin-si (KR); Young-Hyun Jeon, Guri-si (KR); Hun-Joo Lee, Daegu (JP); Dong-Ho Cho, Seoul (KR); Chul-Kee Hong, Hwaseong-si (KR); Hyu-Dae Kim, Daejeon (KR); Ju-Yeop Kim, Anyang-si (KR); Sik Choi, Daejeon (KR); Ho-Won Lee, Chungju-si (KR); Woong-Sup Lee, Daejeon (KR); Se-Young Yun, Jecheon-si (KR)

(73) Assignees: Samsung Electronics Co., Ltd., Suwon-Si (KR); Korea Advanced Institute of Science and Technology (KAIST), Daejeon (KR)

( * ) Notice: Subject to any disclaimer, the term of this patent is extended or adjusted under 35 U.S.C. 154(b) by 1151 days.

(21) Appl. No.: 12/079,582

(22) Filed: Mar. 27, 2008

(65) Prior Publication Data

US 2008/0242291 A1    Oct. 2, 2008

(30) Foreign Application Priority Data

Mar. 27, 2007 (KR) .................. 10-2007-0029798

(51) Int. Cl.
*H04B 7/14* (2006.01)
*H04W 4/00* (2009.01)
*H04B 7/17* (2006.01)

(52) U.S. Cl.
USPC ............ 370/315; 370/328; 455/7; 455/422.1; 375/211

(58) Field of Classification Search
USPC ......................................................... 370/315
See application file for complete search history.

(56) References Cited

U.S. PATENT DOCUMENTS

| 6,272,351 | B1 * | 8/2001 | Langston et al. | 455/507 |
|---|---|---|---|---|
| 7,277,735 | B1 * | 10/2007 | Oh et al. | 455/567 |
| 7,715,787 | B2 * | 5/2010 | Yoon et al. | 455/13.1 |
| 2005/0018629 | A1 * | 1/2005 | Kwon et al. | 370/328 |
| 2005/0141593 | A1 * | 6/2005 | Pasanen et al. | 375/130 |
| 2006/0046643 | A1 * | 3/2006 | Izumikawa et al. | 455/7 |
| 2006/0083191 | A1 * | 4/2006 | Niwano et al. | 370/328 |
| 2007/0248037 | A1 * | 10/2007 | Stewart et al. | 370/328 |
| 2008/0008126 | A1 * | 1/2008 | Shirakabe et al. | 370/329 |
| 2008/0031197 | A1 * | 2/2008 | Wang et al. | 370/331 |
| 2008/0062904 | A1 * | 3/2008 | Tzu-Ming | 370/312 |

(Continued)

FOREIGN PATENT DOCUMENTS

| KR | 10-2006-0096510 | 9/2006 |
|---|---|---|
| KR | 1020080041545 A | 5/2008 |
| WO | WO 2007/003034 A1 | 1/2007 |
| WO | WO 2007/023786 A1 | 3/2007 |

*Primary Examiner* — Guang Li (57) ABSTRACT

Disclosed is a method and system for transmitting and receiving data in a communication system. The system includes a base station, and a relay station connecting the base station with at least one mobile station. The base station transmits data for a plurality of mobile stations to the relay station, and transmits the data to at least one mobile station belonging to the base station from among the plurality of mobile stations. The relay station receives the data from the base station, and transmits the data to at least one mobile station belonging to the relay station from among the plurality of mobile stations in the same interval as an interval where the base station transmits the data to the mobile station.

20 Claims, 5 Drawing Sheets

(56) References Cited

U.S. PATENT DOCUMENTS

| | | | |
|---|---|---|---|
| 2008/0070582 A1* | 3/2008 | Cai ............................... | 455/450 |
| 2008/0075178 A1* | 3/2008 | Lappetelainen et al. ...... | 375/260 |
| 2008/0113616 A1* | 5/2008 | Kim et al. ........................ | 455/7 |
| 2008/0219202 A1* | 9/2008 | Pandey et al. .................. | 370/315 |
| 2008/0285500 A1* | 11/2008 | Zhang et al. ................... | 370/315 |
| 2010/0157885 A1 | 6/2010 | Koyanagi et al. | |

* cited by examiner

METHOD AND SYSTEM FOR TRANSMITTING/RECEIVING DATA IN COMMUNICATION SYSTEM

TECHNICAL FIELD OF THE INVENTION

The present invention relates to a communication system, and more particularly to a method and system for transmitting/receiving data in a multi-hop communication system.

BACKGROUND OF THE INVENTION

As generally known in the art, next-generation communication systems have evolved in the form of a communication system capable of transmitting/receiving data at high speed while ensuring the mobility of a plurality of mobile stations. Also, next-generation communication systems can provide services with varying quality of service (QoS) levels.

In recent years, research has been actively pursued to develop a next-generation communication system for providing users with high-capacity services with various QoS levels as well as high data transfer rate. In such a next-generation communication system, cells with a very small radius must be provided in order to enable high-speed communications and accommodate a large amount of calls. However, when very small cells are provided in a next-generation communication system, it may be impossible to implement the system in the current wireless network design scheme that corresponds to a centralized design scheme. In other words, the next-generation communication system is implemented in such a manner as to be controlled in a decentralized manner, and requires a wireless network design scheme capable of actively coping with environmental changes, such as the addition of a new base station (BS), and the like. Thus, a self-configurable wireless network architecture is required for the next-generation communication system. Here, the self-configurable wireless network refers to a wireless network that can provide communication services through autonomous and decentralized configurations without the control of a central system.

In order to implement the self-configurable wireless network in a next-generation communication system, schemes applied in an ad hoc network, which enables communications between respective devices, must be employed in the next-generation communication system. A typical example thereof is a cellular network using a multi-hop relay scheme, in which a multi-hop relay scheme applied in an ad-hoc network is employed in a cellular network system including a fixed base station (BS).

In particular, next-generation communications are actively considering using the multi-hop relay scheme for increasing system capacity and extending service coverage. Hereinafter, how to increase system capacity and extend service coverage in a communication system using a multi-hop scheme (hereinafter referred to as "multi-hop communication system") will be discussed. First of all, an increase in system capacity is achieved as follows: when channel conditions between a BS and an MS in a multi-hop communication system are relatively poor, a relay station (RS) located between the BS and the MS relays data transmitted and received between the BS and the MS. Thus, the MS can increase data capacity by transmitting and receiving data over a channel that has better channel conditions from among the BS and the RS, which results in an increase in system capacity.

Next, an extension of service coverage is achieved as follows: in a multi-hop communication system, an RS relays data, which has been received from a BS, to an MS located within a cell region, or relays data, which has been received from an MS, to a BS.

However, there has not been concretely proposed an efficient data transmission/reception procedure between a BS and an RS and an MS when the same data is transmitted to a plurality of mobile stations in multi-hop communication system as described above.

SUMMARY OF THE INVENTION

To address the above-discussed deficiencies of the prior art, it is a primary object of the present invention to solve at least the above-mentioned problems occurring in the prior art, and the present invention provides a method and system for transmitting/receiving data in a communication system.

Further, the present invention provides a method and system for providing a frame structure for allowing a base station and a relay station to simultaneously multicast the same data, and transmitting and receiving data by using the frame structure in a multi-hop communication system.

Further, the present invention provides a method and system for transmitting and receiving data in a multi-hop communication system, in which a base station and a relay station simultaneously multicast the same data, and thereby resources for use in data transmission can be saved.

In accordance with an aspect of the present invention, there is provided a method of transmitting and receiving data in a communication system, the method including the steps of: transmitting data for a plurality of mobile stations to a relay station by a base station; and simultaneously transmitting the data to the plurality of mobile stations by the base station and the relay station.

In accordance with another aspect of the present invention, there is provided a system for transmitting and receiving data in a communication system, the system including: a base station for transmitting data for a plurality of mobile stations to a relay station, and transmitting the data to at least one mobile station belonging to the base station from among the plurality of mobile stations; and the relay station for connecting the base station with at least one mobile station, receiving the data from the base station, and transmitting the data to at least one mobile station belonging to the relay station from among the plurality of mobile stations in the same interval as an interval where the base station transmits the data to the mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

The present invention proposes a method and system for transmitting and receiving data in a communication system. In the following embodiments of the present invention, a method and system is proposed, in which a base station (BS) and a relay station (RS) that has fixity and mobility simultaneously transmit and receive the same data to subscriber terminals, that is, mobile stations (MS), in a multi-hop communication system.

Also, the present invention proposes a frame structure for allowing a BS and an RS to simultaneously transmitting the same data to mobile stations. In the following embodiments of the present invention, a method and system is proposed, in which when first data to be transmitted to a plurality of mobile stations by a BS and an RS occurs in a multi-hop communication system, mobile stations that are to transmit the first data are identified from among all the mobile stations included in cells of the BS and the RS to thereby generate one mobile station (MS) group, the BS transmits the first data to the RS, and the BS and the RS simultaneously transmit the first data to the MS group by using the same resource.

In a multi-hop communication system according to embodiments of the present invention, as will be described below, it is assumed that an RS is a fixed RS, and one BS has six relay stations. It is also assumed that channel conditions between a BS and relay stations are good.

Reference will now be made to a method of transmitting data in a multi-hop communication system.

Figure 1:
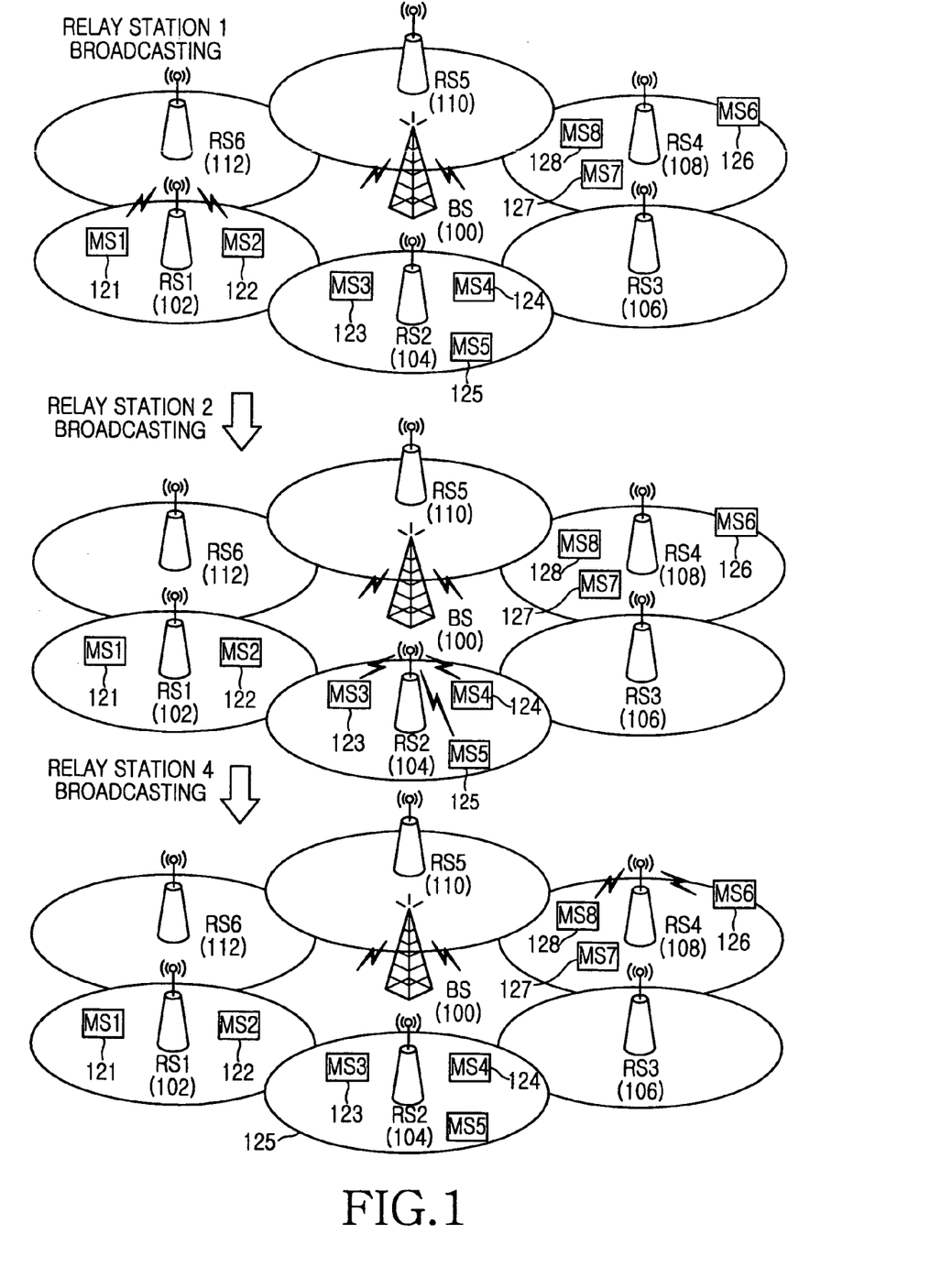
FIG. 1 is a view illustrating a first way to transmit data in a multi-hop communication system.

FIG. 1 illustrates a first way to transmit data in a multi-hop communication system.

Referring to FIG. 1, the multi-hop communication system includes a BS 100, a plurality of relay stations 102, 104, 106, 108, 110, 112, and a plurality of mobile stations 121, 122, 123, 124, 125, 126, 127, 128.

First, the BS 100 transmits, that is, broadcasts, data to MS1 121 to MS8 128 by using a first resource. However, since MS1 121 to MS8 128 exist outside of a cell that is under the control of the BS 100, they have poor channel conditions. On account of this, MS1 121 to MS8 128 cannot normally receive the data. Thus, the data is received by RS1 102 to RS6 112, which provide relay paths between the BS 100 and the mobile stations.

Upon receiving the data, RS1 102 to RS6 112 broadcast the data to the mobile stations belonging to the respective relay stations. That is, RS1 102 relays the data to MS1 121 and MS2 122, RS2 122 relays the data to MS3 123, MS4 124 and MS5 125, and RS4 108 relays the data to MS6 126, MS7 127 and MS8 128.

More specially, RS1 102 to RS4 108 relay the data to the mobile stations belonging to the respective relay stations by using different resources. In other words, RS1 102 relays the data to MS1 121 and MS2 122 by using a second resource, RS2 104 relays the data to MS3 123, MS4 124 and MS5 125 by using a third resource, and RS4 108 relays the data to MS6 126, MS7 127 and MS8 128 by using a fourth resource.

Since the respective relay stations transmit the data to the respective mobile stations at different times, as described above, it is possible to adjust a data transfer rate.

Next, with reference to FIG. 2, a description will be given of another way to transmit data in a multi-hop communication system.

Figure 2:
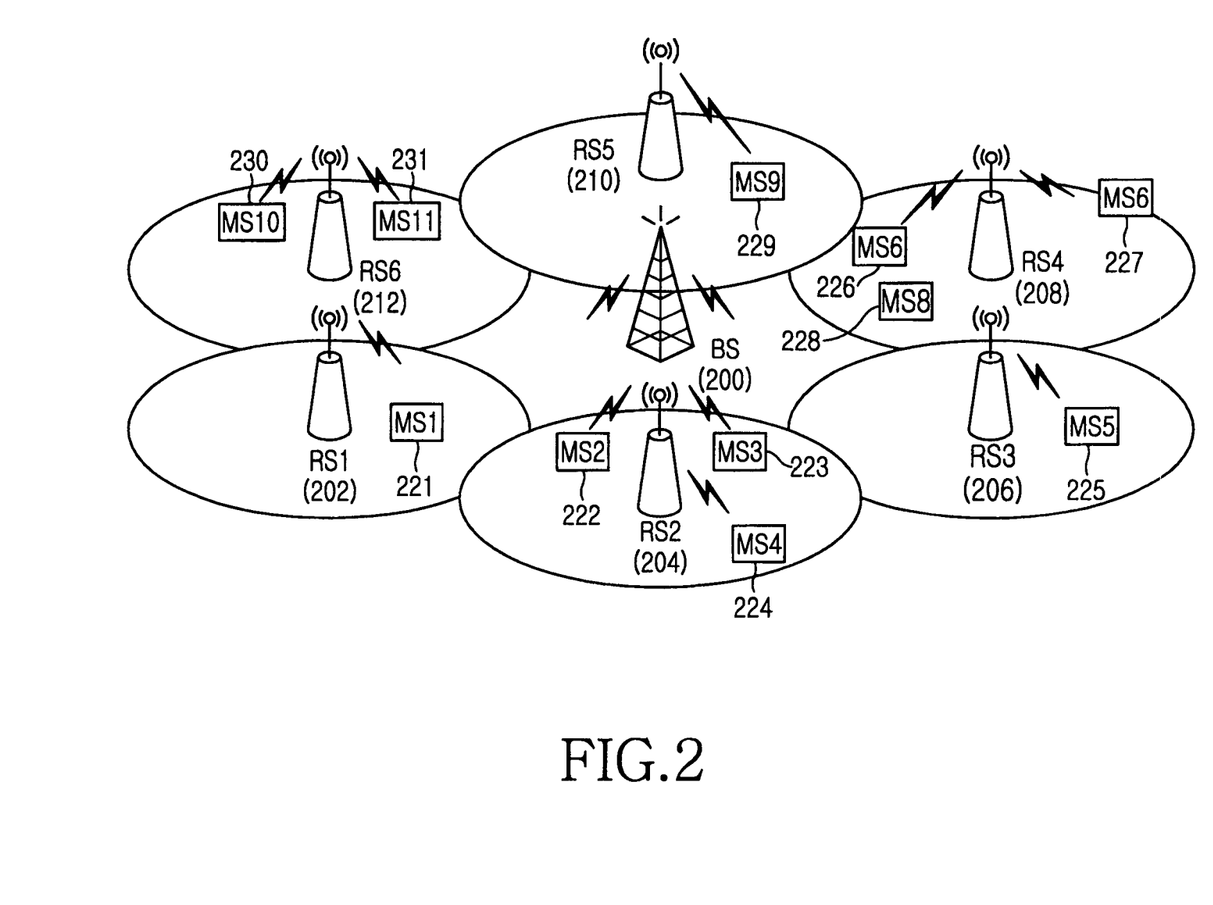
FIG. 2 is a view illustrating a second way to transmit data in a multi-hop communication system.

FIG. 2 illustrates a second way to transmit data in a multi-hop communication system.

Referring to FIG. 2, the multi-hop communication system includes a BS 200, a plurality of relay stations 202, 204, 206, 208, 210, 212, and a plurality of mobile stations 221, 222, 223, 224, 225, 226, 227, 228, 229, 230, 231.

First, the BS 200 broadcasts data to MS1 221 to MS11 231 by using a first resource. However, since MS1 221 to MS11 231 exist outside of a cell that is under the control of the BS 200, they have poor channel conditions. On account of this, MS1 221 to MS11 231 cannot receive the data. Thus, the data is received by RS1 202 to RS6 212 that provide relay paths between the BS 200 and the mobile stations.

Upon receiving the data, RS1 202 to RS6 212 broadcast the data to the mobile stations belonging to the respective relay stations. That is, RS1 202 relays the data to MS1 221, RS2 204 relays the data to MS2 222, MS3 223 and MS4 224, and RS3 206 relays the data to MS5 225. Also, RS4 208 relays the data to MS6 226, MS7 227 and MS8 228, RS5 210 relays the data to MS9 229, and RS6 212 relays the data to MS10 230 and MS11 231.

More specially, RS1 202 to RS6 212 relays the data to the mobile stations belonging to the respective relay stations by using the same resource.

Reference will now be made to a frame structure for transmitting data in a multi-hop communication system, with reference to FIG. 3.

Figure 3:
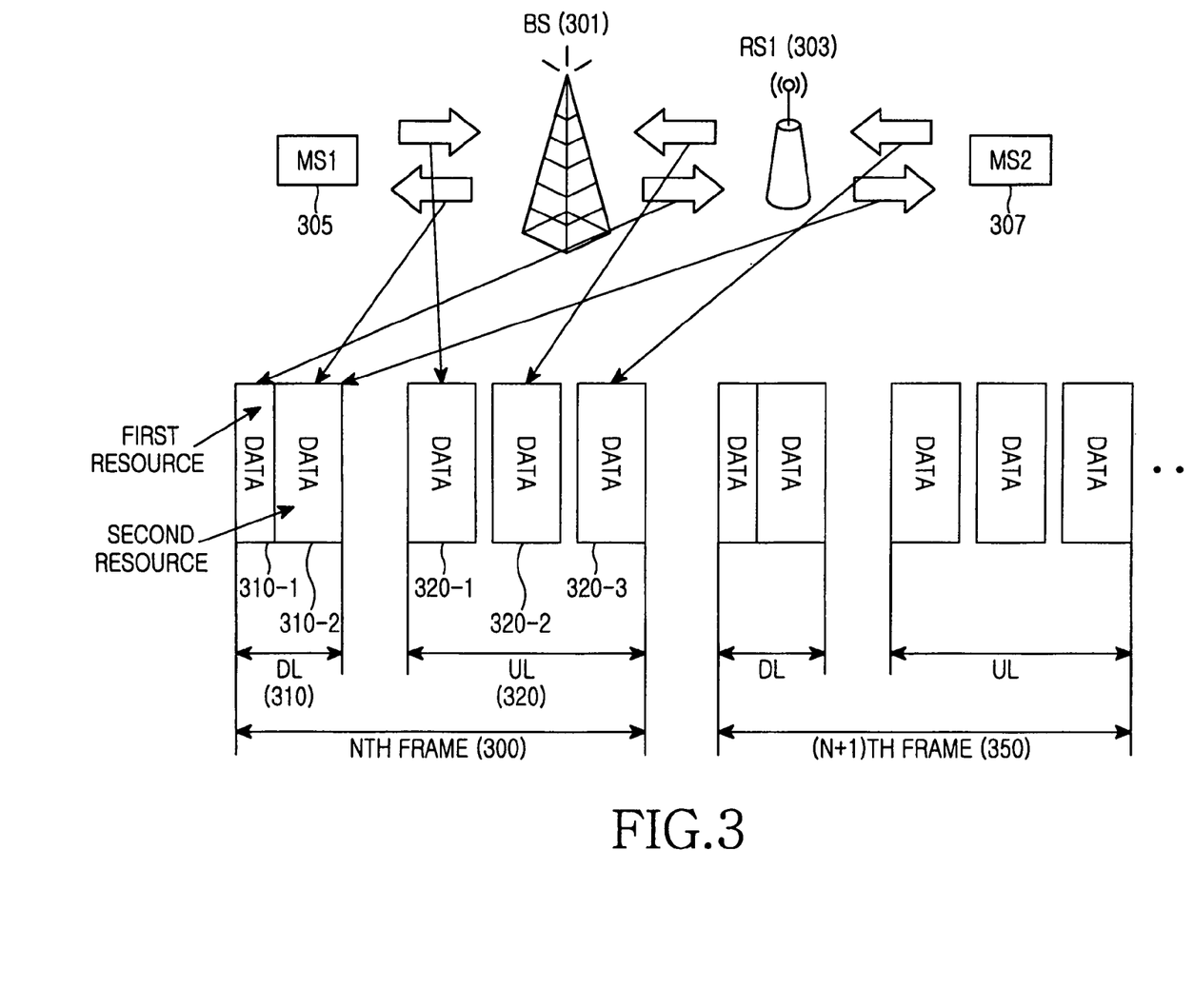
FIG. 3 is a view illustrating a frame structure for transmitting data in a multi-hop communication system in accordance with an exemplary embodiment of the present invention.

FIG. 3 illustrates a frame structure for transmitting data in a multi-hop communication system according to an exemplary embodiment of the present invention.

Referring to FIG. 3, a frame 300 includes a downlink sub-frame 310 and an uplink sub-frame 320.

The downlink sub-frame 310 includes a first interval 310-1 in which data is transmitted from a BS 301 to RS1 303, and a second interval 310-2 in which data is transmitted to mobile stations 305, 307. Thus, the BS 301 and RS1 303 simultaneously transmit the same data to MS1 305 and MS2 307 by using the same resource.

More specially, the BS 301 first transmits data, which is to be transmitted to MS1 305 and MS2 307, to RS1 303 by using a first resource defined by the first interval 310-1.

Next, the BS 301 transmits the data to MS1 305 by using a second resource defined by the second interval 310-2. At the same time, RS1 303 transmits the data to MS2 307 by using the second resource. With regard to this, a data transfer rate used when the BS 301 transmits the data to RS1 303 may be set higher than that used when RS1 303 transmits the data to MS2 307.

The uplink sub-frame 320 is divided into three parts. When MS1 305 transmits data to the BS 301, it transmits the data by using a third interval 320-1. When RS1 303 transmits data to the BS 301, it transmits the data by using a fourth interval 320-2. Also, when MS2 307 transmits data to RS1 303, it transmits the data by using a fifth interval 320-3.

Using the above-mentioned frame structure in this way, the BS 301 and RS1 303 can simultaneously multicast the same data to the mobile stations 305, 307 by using the same resource.

Next, with reference to FIG. 4, a description will be given of a procedure of transmitting data in a multi-hop communication system according to an exemplary embodiment of the present invention.

Figure 4:
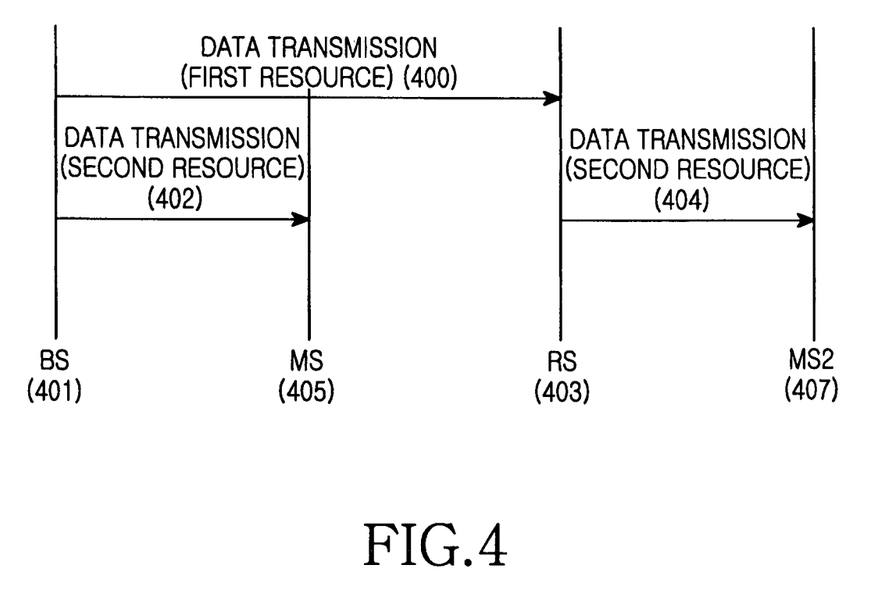
FIG. 4 is a view illustrating a procedure of transmitting and receiving data in a multi-hop communication system in accordance with an exemplary embodiment of the present invention.

FIG. 4 illustrate a procedure of transmitting data in a multi-hop communication system according to an exemplary embodiment of the present invention.

In FIG. 4, it is assumed that MS1 405 is included in a cell that is under the control of a BS 401, and MS2 407 is included in a cell that is under the control of RS 403.

Although not illustrated in the drawing, when the same first data is to be transmitted to MS1 405 and MS2 407, the BS 401 searches for mobile stations 405, 407 that is to receive the first data from among all mobile stations included in any one of the BS 401 and the RS 403, and groups the searched mobile stations 405, 407 into one MS group.

Conventionally, each of the BS and the RS generates each group by using mobile stations included in a corresponding cell. However, in the present invention, one group can be generated using mobile stations included in any one of the BS and the RS. That is, the BS can group MS1 405 and MS2 407 illustrated in FIG. 5 into the same group. Thus, a communication system as proposed in the present invention can simultaneously provide the same data to more mobile stations than in the prior art.

In order to simultaneously multicast the first data to MS1 405 and MS2 407, the BS 401 transits the data to the RS 403 by using a first resource of a downlink sub-frame (step 400). With regard to this, when MS1 405 has good channel conditions, it can receive the first data transmitted from the BS 401 to the RS 403.

In addition, the BS 401 transmits the first data to MS1 405 by using a second resource of the downlink sub-frame (step 402). At the same time, the RS receives the data transmitted from the BS 401, and then transmits the first data to MS2 407 by using the second resource (step 404).

Reference will now be made to a procedure of simultaneously transmitting data to mobile stations belonging to a BS in a multi-hop communication system according to an exemplary embodiment of the present invention, with reference to FIG. 5.

Figure 5:
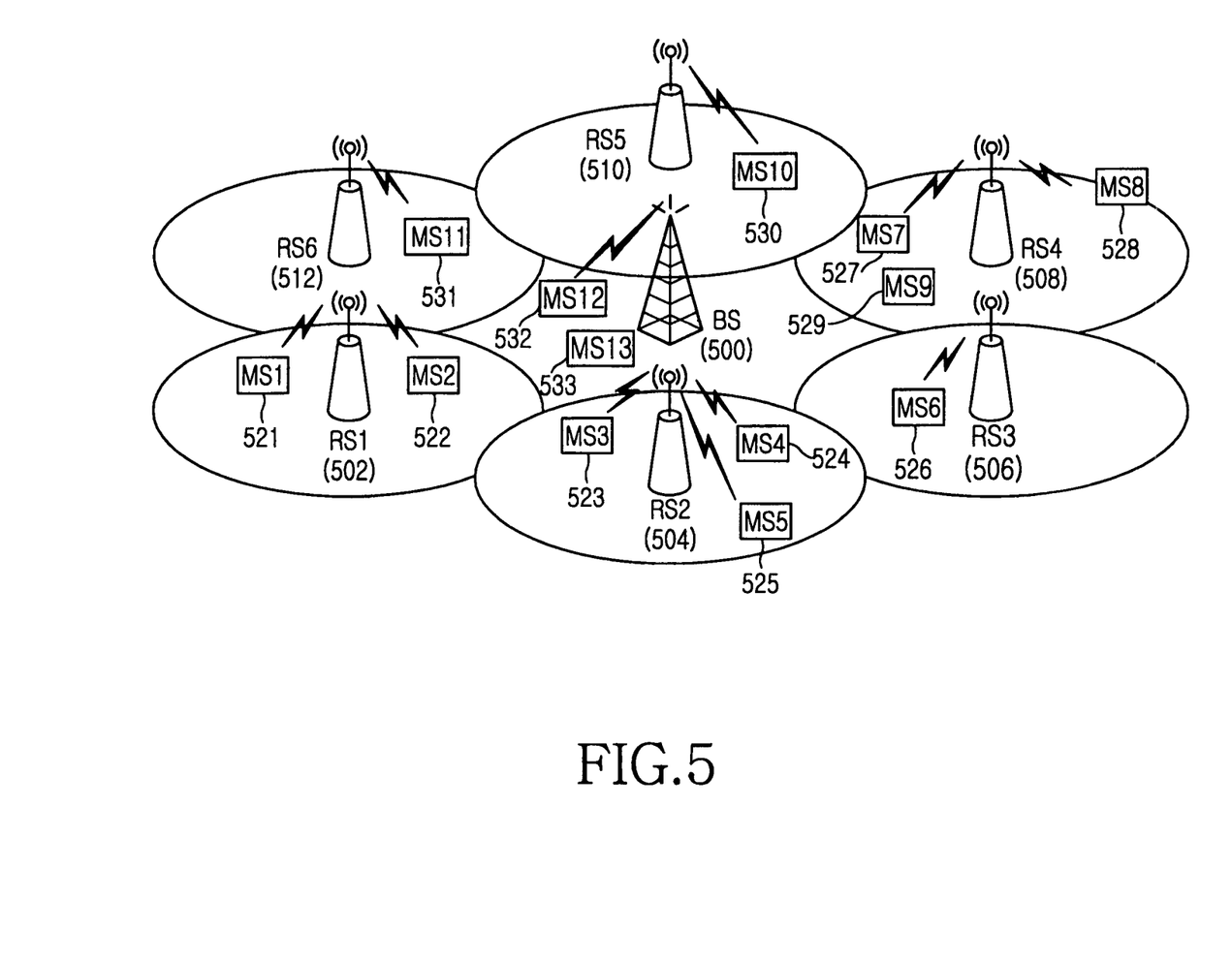
FIG. 5 is a view illustrating a procedure of simultaneously transmitting data to mobile stations by a BS and an RS in a multi-hop communication system in accordance with an exemplary embodiment of the present invention.

FIG. 5 illustrates a procedure in which a BS and an RS simultaneously transmit data to mobile stations in a multi-hop communication system according to an exemplary embodiment of the present invention.

Referring to FIG. 5, the multi-hop communication system includes a BS 500, a plurality of relay stations 502, 504, 506, 508, 510, 512, and a plurality of mobile stations 521, 522, 523, 524, 525, 526, 527, 528, 529, 530, 531, 532, 533.

First, when the BS 500 is to transmit the same data to the plurality of mobile stations, it searches for mobile stations that is to receive the data from among the plurality of mobile stations 521, 522, 523, 524, 525, 526, 527, 528, 529, 530, 531, 532, 533, and generates one group consisting of the searched mobile stations. The BS 500 transmits the data to the relay stations 502, 504, 506, 508, 510, 512 by using a first resource of a downlink sub-frame.

If the mobile stations 532, 533 included in a cell that is under the control of the BS 500 have good channel conditions, the mobile stations 532, 533 can receive the data.

In addition, the BS 500 transmits the data to the mobile stations belonging to the BS 500, that is, MS12 532 and MS13 533, by using a second resource of the downlink sub-frame, and simultaneously the relay stations 502, 504, 506, 508, 510, 512 also transmit the data to the mobile stations belonging to the respective relay stations by using the second resource. That is, RS1 502 relays the data to MS1 521 and MS2 522, RS2 504 relays the data to MS3 523, MS4 524 and MS5 525, RS3 506 relays the data to MS6 526, RS4 508 relays the data to MS7 527, MS8 528 and MS9 529, RS5 relays the data to MS10 530, and RS6 512 relays the data to MS11 531.

As described above, the BS 500 and the relay stations 502, 504, 506, 508, 510, 512 can simultaneously transmit the same data to the mobile stations included in the MS group by using the same resource. In this way, since the BS 500 and the relay stations 502, 504, 506, 508, 510, 512 transmit data by using the same resource, the amount of unnecessarily used resources can be reduced.

Further, since the mobile stations belonging to the BS 500, that is, MS12 532 and MS13 533, can repeatedly receive the same data twice from the BS, they can obtain a diversity gain.

According to the present invention as described above, when mobile stations are to receive the same data in a multi-hop communication system, a BS and an RS can simultaneously transmit the same data to the mobile stations by using the same resource. Since the BS and the RS transmit the same data to the mobile stations by using the same resource, unnecessary use of resources can be reduced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of transmitting and receiving data in a communication system, the method comprising the steps of:
    transmitting data for a plurality of mobile stations to a relay station by a base station; and
    simultaneously transmitting the data to the plurality of mobile stations by the base station and the relay station,
    wherein the relay station and the base station transmit the data to the plurality of mobile stations by using a same resource, and
    wherein in the step of transmitting the data to the relay station, the data is transmitted at a second data transfer rate that is higher than a first data transfer rate at which the relay station transmits the data to at least one mobile station belonging to the relay station from among the plurality of mobile stations.

2. The method as claimed in claim 1, wherein the plurality of mobile stations belongs to any one of the base station and the relay station.

3. The method as claimed in claim 1, wherein in the step of transmitting the data to the relay station, the data is transmitted using a first interval of a downlink sub-frame.

4. The method as claimed in claim 3, further comprising the step of transmitting the data to at least one mobile station belong to the base station in the first interval by the base station.

5. The method as claimed in claim 3, wherein the plurality of mobile stations belongs to any one of the base station and the relay station.

6. The method as claimed in claim 1, wherein in the step of transmitting the data to the plurality of mobile stations, the data is transmitted using a second interval following the first interval.

7. A system for transmitting and receiving data in a communication system, the system comprising:
a base station configured to transmit data for a plurality of mobile stations to a relay station, and transmit the data to at least one mobile station belonging to the base station from among the plurality of mobile stations; and
the relay station configured to connect the base station with at least one mobile station, receive the data from the base station, and transmit the data to at least one mobile station belonging to the relay station from among the plurality of mobile stations in the same interval as an interval where the base station transmits the data to the mobile station,
wherein the relay station and the base station transmit the data to the plurality of mobile stations by using a same resource, and
wherein when the data is transmitted from the base station to the relay station, the base station transmits the data at a second data transfer rate that is higher than a first data transfer rate at which the relay station transmits the data to the at least one mobile station belonging to the relay station.

8. The system as claimed in claim 7, wherein the plurality of mobile stations belong to any one of the base station and the relay station.

9. The system as claimed in claim 7, wherein the base station transmits the data to the relay station by using a first interval of a downlink sub-frame.

10. The system as claimed in claim 9, wherein the base station transmits the data to the at least one mobile station belonging to the base station in the first interval.

11. The system as claimed in claim 9, wherein the plurality of mobile stations belong to any one of the base station and the relay station.

12. The system as claimed in claim 7, wherein the base station and the relay station transmit the data to the plurality of mobile stations by using a second interval following the first interval.

13. A communication system, comprising:
a base station configured to communicate with a plurality of relay stations and a plurality of mobile stations, the base station configured to transmit data for the plurality of mobile stations to at least one of the relay stations, and transmit the data to at least one of the mobile stations; and
at least one relay station configured to connect the base station with at least one mobile station, receive the data from the base station, and transmit the data to the at least one mobile station belonging to the relay station in the same interval as an interval where the base station transmits the data to the at least one mobile station,
wherein the at least one relay station and the base station transmit the data to the plurality of mobile stations by using a same resource, and
wherein when the data is transmitted from the base station to the at least one relay station, the base station transmits the data at a second data transfer rate that is higher than a first data transfer rate at which the at least one relay station transmits the data to the at least one mobile station belonging to the at least one relay station.

14. The communication system as claimed in claim 13, wherein the plurality of mobile stations belong to any one of the base station and the plurality of relay stations.

15. The communication system as claimed in claim 13, wherein the base station transmits the data to the at least one relay station by using a first interval of a downlink sub-frame.

16. The communication system as claimed in claim 15, wherein the base station transmits the data to the at least one mobile station belonging to the base station in the first interval.

17. The communication system as claimed in claim 15, wherein the plurality of mobile stations belong to any one of the base station and the plurality of relay stations.

18. The communication system as claimed in claim 13, wherein the base station and the at least one relay station transmit the data to the plurality of mobile stations by using a second interval following the first interval.

19. The communication system as claimed in claim 18, wherein the first interval and the second interval are part of the same resource.

20. The communication system as claimed in claim 13, wherein the base station transmits the data to a first mobile station and the at least one relay station transmits the data to a second mobile station using the same resource.

* * * * *